United States Patent
Borders et al.

(10) Patent No.: US 10,689,194 B2
(45) Date of Patent: Jun. 23, 2020

(54) MOBILE ROBOT LOADER-UNLOADER SYSTEM AND METHOD

(71) Applicant: HDS Mercury Inc., Palo Alto, CA (US)

(72) Inventors: Louis Borders, Palo Alto, CA (US); Aravind Durai, Palo Alto, CA (US)

(73) Assignee: HDS Mercury, Inc., Palo Alto, CA (US)

( * ) Notice: Subject to any disclaimer, the term of this patent is extended or adjusted under 35 U.S.C. 154(b) by 189 days.

(21) Appl. No.: 15/738,520

(22) PCT Filed: Jun. 23, 2016

(86) PCT No.: PCT/US2016/039010
§ 371 (c)(1),
(2) Date: Dec. 20, 2017

(87) PCT Pub. No.: WO2016/210126
PCT Pub. Date: Dec. 29, 2016

(65) Prior Publication Data
US 2018/0186582 A1  Jul. 5, 2018

Related U.S. Application Data

(60) Provisional application No. 62/231,092, filed on Jun. 24, 2015, provisional application No. 62/302,070, filed on Mar. 1, 2016.

(51) Int. Cl.
| | |
|---|---|
| *B65G 1/06* | (2006.01) |
| *B65G 65/00* | (2006.01) |
| *B65G 67/02* | (2006.01) |
| *B65G 1/04* | (2006.01) |
| *B25J 5/00* | (2006.01) |
| *B65G 67/22* | (2006.01) |
| *B25J 9/16* | (2006.01) |

(52) U.S. Cl.
CPC ............... *B65G 1/06* (2013.01); *B25J 5/007* (2013.01); *B65G 1/0421* (2013.01); *B65G 1/0492* (2013.01); *B65G 65/00* (2013.01); *B65G 67/02* (2013.01); *B65G 67/22* (2013.01); *B25J 9/162* (2013.01); *Y10S 901/01* (2013.01)

(58) Field of Classification Search
CPC ..................................................... B65G 1/065
USPC ................................................. 414/337, 338
See application file for complete search history.

(56) References Cited

U.S. PATENT DOCUMENTS

| | | | | |
|---|---|---|---|---|
| 1,499,971 | A * | 7/1924 | Callison | B65G 63/006 414/337 |
| 3,731,790 | A * | 5/1973 | Esser | B65G 1/065 198/751 |
| 4,508,484 | A | 4/1985 | Heiz | |
| 4,746,258 | A | 5/1988 | Loomer | |
| 4,818,171 | A | 4/1989 | Burkholder | |

(Continued)

*Primary Examiner* — Jonathan Snelting
(74) *Attorney, Agent, or Firm* — Cherskov Flaynik & Gurda, LLC

(57) ABSTRACT

A system for moving payloads is described. It uses one or more mobile robots. Each mobile robot comprises a payload bearing platform, and a payload release latch. The system includes one or more stack exchangers having a set of alignment rails, a payload transfer ramp, and a latch engagement bar. The mobile robots pass through the stack exchanger and pick up a payload or drop off a payload without fully stopping motion.

20 Claims, 15 Drawing Sheets

(56) References Cited

U.S. PATENT DOCUMENTS

| | | | |
|---|---|---|---|
| 5,183,368 A * | 2/1993 | Douard | B61B 5/02 198/465.1 |
| 6,652,213 B1 | 11/2003 | Mitchell | |
| 7,261,511 B2 | 8/2007 | Felder | |
| 8,128,064 B2 | 3/2012 | Franzen | |
| 8,639,382 B1 | 1/2014 | Clark | |
| 8,965,561 B2 | 2/2015 | Jacobus | |
| 8,948,914 B2 | 3/2015 | Zini | |

* cited by examiner

MOBILE ROBOT LOADER-UNLOADER SYSTEM AND METHOD

PRIORITY

This national filing claims priority to PCT application PCT/US2016/039010 which in turn claimed priority to U.S. provisional application Ser. No. 62/231,092, filed on Jun. 24, 2015, and U.S. provisional application Ser. No. 62/302,070, filed on Mar. 1, 2016, the contents of each application are hereby incorporated by reference.

BACKGROUND OF THE INVENTION

1. Field of the Invention

The field of the invention is a system and method for optimally moving objects on a worksite using standard mobile robots. The system allows for exchange of mobile robot payload while the mobile robot is in motion, in one embodiment. In another embodiment, the robot may be in motion or stationary but, nonetheless without the docking or alignment process.

2. Background of the Invention

In various embodiments, the invention provides a system and method of moving inventory, empty containers, totes, orders, boxes, kits, etc. around a premises, such as warehouses and factories, without relying on fixed conveyors or other permanent infrastructure. Examples of such avoided infrastructure include moving shelves, overhead delivery systems, or autonomous carts moving in fixed tracks. Further, the system employs high throughput payload exchange which does not require the mobile robots to cease motion prior to receiving or depositing a payload.

In one embodiment, the invention comprises a number of mobile robots cooperating to move payloads around a known environment, such as a warehouse. Each robot includes a payload bearing platform and a mechanism to release a load from the platform. The mobile robots pick up and drop off payloads at designated stack exchanger devices. The stack exchangers include means to align the mobile robots as they pass through the stack exchangers, automatically retrieving or depositing payloads on each passing mobile robot. The mobile robots interact with the stack exchangers as the mobile robots remain in motion and so can pick up or drop off payloads without stopping, in one embodiment. In another embodiment, mobile robots stop to wait for additional shipments. In yet another embodiment, mobile robots stop to interact with alignment devices. Nonetheless, the mobile robots themselves do not have to go through complicated alignment procedures.

Traditionally, mobile robots interact with fixed infrastructure, such as charging stations or conveyor belt end points following a careful alignment process, which requires the mobile robot to move back and forth until the required alignment is achieved. This process is time-consuming and prevents the use of mobile robots for tasks that would require several transfers. As such, worksites are generally designed with large quantities of fixed conveyor belts and other infrastructure to move product within the worksite. This results in worksites that cannot be updated should the needs of the owner change and are expensive to set up.

A need exists in the art for a system that allows for moving inventory on a premises, without relying on conveyor belts and other fixed infrastructure. Instead, the present system uses a fleet of mobile robots. The system does not require each robot to stop all movement prior to changing the robot's payload. Further, each robot does not have to perform highly precise alignment procedures and is instead guided by the system elements.

SUMMARY OF INVENTION

An object of the invention is to create a system for moving payloads on a premises, such as a warehouse. An advantage of the invention is that it allows for transport of inventory within a warehouse. An advantage of the invention is that it enables highly accurate inventory management using mobile robots.

Another object of the invention is to allow for movement of inventory within a warehouse without requiring significant changes to the mobile robots, including adding many sensors. A feature of the invention is that simple mobile robots with only minimal sensors are used. An advantage of the invention is that it provides new functionality for an existing fleet of mobile robots without requiring additional sensors.

A further object of the invention is to provide a system which does not require new powered elements in the mobile robots. A feature of the invention is that the mobile robots participating in the system require only the addition of a spring-loaded mechanism to operate with payload exchange elements of the system. An advantage of the invention is that mobile robots can be readily retrofitted to be included with the system.

An object of the invention is to provide a means to move inventory around a warehouse without requiring extensive conveyor belts and other fixed systems. A feature of the invention is that it relies on exchange of payloads between mobile robots at known points in the warehouse. An advantage of the invention is that payloads are carried large distances without requiring conveyor belts.

Yet another object of the invention is to allow for efficient transfers of payloads between mobile robots. A feature of the invention is that the mobile robots do not have to come to a complete stop before a payload is either removed or added to the robot. A further feature is that each mobile robot does not require precise alignment with a fixed element prior to transferring payloads between the mobile robot and the environment. An advantage of the system is that mobile robots can be given payloads or receive payloads without taking the time to stop or precisely align with a fixed point in the infrastructure.

A further object of the invention is to provide a system which can be deployed on demand. A feature of the invention is that the elements of the system, such as the mobile robots and the exchanger platforms may be deployed on demand and are not located at fixed locations within a premises. A benefit of the system is that changes in demand for movement of goods within a premises are accommodated.

Another object of the invention is to provide a system which allows for a large number of concurrent exchanges of payloads. A feature of the invention is that multiple exchanger platforms may be coupled to form an array which allows for simultaneous exchange of payloads to and from many mobile robots. A benefit of the system is that choke points within the premises are avoided.

An additional object of the system is to provide a fast way to move payloads between mobile robots. A feature of the system is that distances between coupled exchanger platforms can be minimized as to limit distance that payloads must travel. A benefit of the system is that payloads are available for pickup very soon after being dropped off.

A further object of the system is to provide a location to manipulate payloads. A feature of the system is that in one embodiment an array of stack exchangers includes a device to disassemble payloads as well as a device to reassemble payloads. A benefit of the system is that it allows for efficient changes to payloads to be picked up or sent by each mobile robot.

An additional object of the system is to use mechanical components in place of active electronic ones. A feature of the invention is that several elements, such as modifications to the mobile robots as well as elements in the stack exchanger are passive mechanical elements rather than active pneumatic or electronic ones. A benefit of the invention is that in some embodiments, the system requires no additional electronic components.

A further object of the invention is to provide a system which does not require special electrical connections between mobile robots and the station where payloads are exchanged. A feature of the system is that the stack exchangers do not send electronic commands to the mobile robots prior to interacting with the mobile robot payloads. A benefit of the system is that it does not rely on electronic signals being received by highly modified robots.

An additional object of the invention is to convey payloads using adjustable stations. A feature of the system is that actuated arms direct payloads for pick up or drop off. A benefit of the system is that it allows for bidirectional sending or receiving of payloads on a stack exchanger.

A further object of the invention is to standardize storage within a facility. A feature of the system is that in one embodiment, it uses totes and trays to store the inventory at a facility. A benefit of the system is that the mobile robots interacting with the inventory can do so with precision.

An additional object of the invention is to provide a system for conveying multiple large items to a worksite on a premises. A feature of the system is that in one embodiment the mobile robot engages a frame which is used to move large quantities of similar objects. A benefit of the system is that large quantities of bulky items may be moved to a worker at a job site with ease.

An additional object of the invention is to allow for the addition of the automated system to a pre-existing premises. A feature of one embodiment of the system is that it can be implemented on any job site, including one that already has some conveyors. A benefit of the system is that it can be deployed in both new construction as well as pre-existing warehouses.

A further object of the invention is to eliminate fixed infrastructure on the premises. A feature of the invention is that it moves inventory and other items using mobile robots. A benefit of the invention is that it reduces or eliminates fixed mechanisms needed to exchange payloads and move them around the premises.

An additional object of the invention is to allow flexible exchange of payloads between different types of mechanisms on a premises. A feature of the invention is that mobile robots can cooperate with the stack exchangers described in this invention as well as other mechanisms, such as applicant's RoboFrame docks, lineside delivery stations, and other types of inventory management systems. A benefit of the system is that it allows for flexible handling of inventory.

A further object of the invention is to provide a system which iteratively improves performance. A feature of the invention is that elements of the system, such as the stack exchangers, improve with time as the mobile robot guidance and scheduling software compensates for time delays observed during operation of the system. A benefit of the invention is that the mobile robots will optimize operation to travel at higher speeds and exchange payloads with less delay over time.

An additional object of the invention is to automatically verify payloads within the system. A feature of the invention is that one or more scales are incorporated in the stack exchangers, which confirm that payloads have the required weight, both at time of sending and receiving. A benefit of the system is that it can track payloads at all stages of transmission with weight readings.

A further object of the invention is to facilitate handling of objects or payloads that require manual review. A feature of the invention is that by using highly flexible mobile robots, payloads or items requiring manual review or another form of intervention (such as potential expiration or incorrect temperature readings), can be re-routed on demand. A benefit of the invention is that items can be re-routed to a manual review station without a dedicated conveyor lane, as required in prior art systems.

An additional object of the invention is to provide a system which support flexible payloads. In one embodiment, a large variety of stack sizes can be created (with a minimum of one container and a maximum of six small containers, in one embodiment). In one embodiment, up to ten empty collapsed containers may be moved using a single mobile robot. A benefit of the system is that it can respond to changes in demand within the premises, as needed.

A system for moving payloads comprising: at least one mobile robot; wherein each mobile robot comprises a payload bearing platform, and a payload release latch; and at least one stack exchanger having a set of alignment rails, a payload transfer ramp, and a latch engagement bar; wherein each said mobile robot passes through the stack exchanger and picks up a payload or drops off a payload without fully stopping motion; wherein said stack exchanger alignment rails direct each mobile robot payload bearing platform to reversibly engage the payload transfer ramp and the stack exchanger latch engagement bar releases each mobile robot's payload release latch during mobile robot traversal of said stack exchanger.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
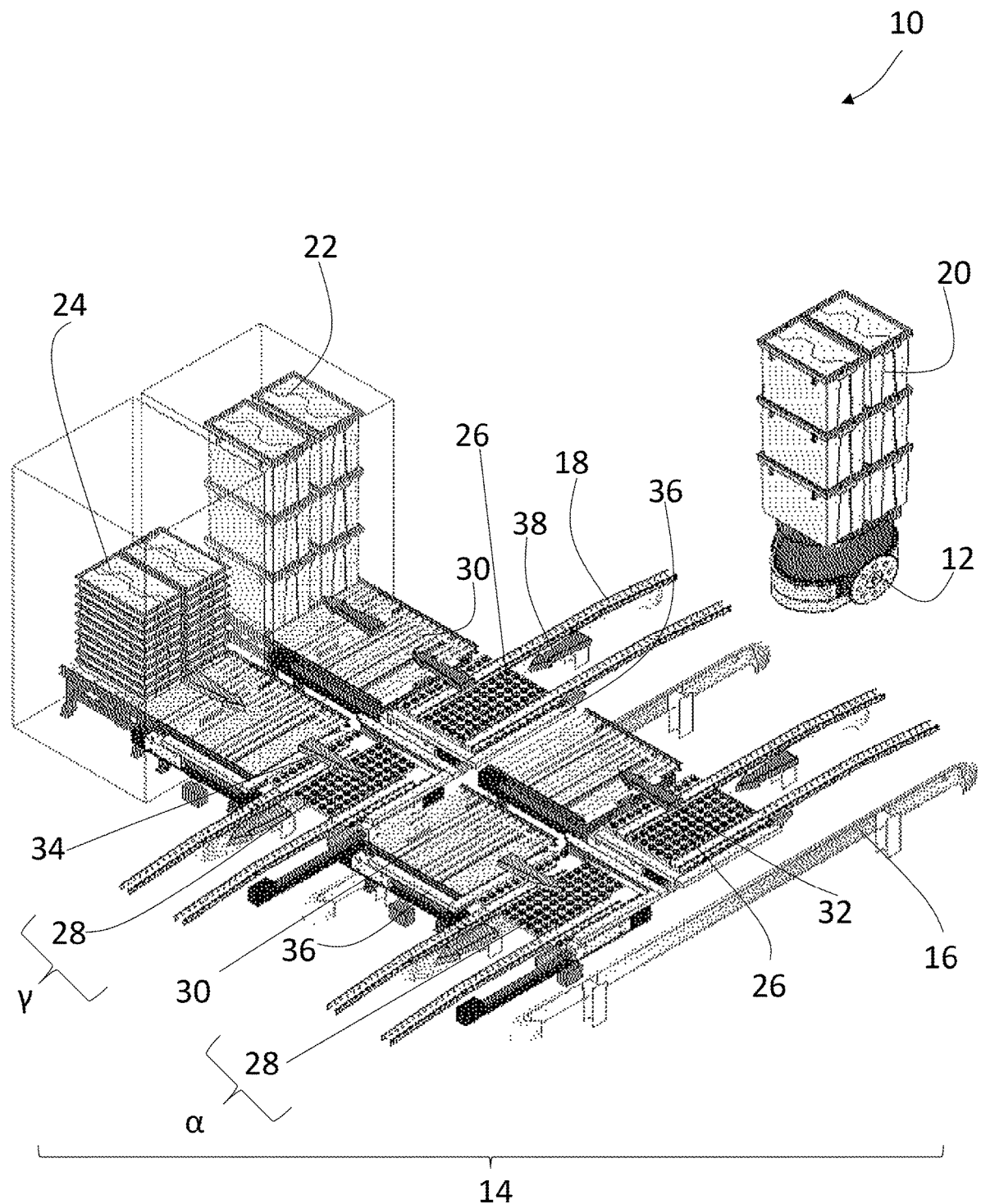
FIG. 1 depicts an overview of the system pursuant to one embodiment of the invention.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Overview

An overview of the system is presented in FIG. 1. As shown therein, the system comprises at least one mobile robot 12, the details of which will be discussed below. While a singular mobile robot 12 is shown in FIG. 1 for the sake of clarity, as implemented, the system 10 is designed to operate a fleet of mobile robots 12. In one embodiment, the system 10 operates with a minimum of one mobile robot 12 and a no theoretical maximum of mobile robots 12. Inasmuch as the mobile robots 12 are semi-autonomous, and not constantly controlled by a central server, they do not each require a wireless communication channel with a central controller, and so the maximum number of robots is not set by available radio frequency spectrum, as would be the case if the mobile robots required constant direct communication. Instead, the mobile robots share limited communications channels, in one embodiment. In use, the quantity of mobile robots 12 used with the system 10 is optimized for the amount movement of goods that is required by the system 10.

In one embodiment, the mobile robots 12 are substantially autonomous and select their own routes to and from each destination within the premises. In another embodiment, each robot's movement is subject to centralized control.

The mobile robots 12 are designed to work with multiple stack exchangers 14. FIG. 1 shows a stack exchanger 14 having two stations a and y. Multiple mobile robots 12 can interact with each station concurrently. For example, while one mobile robot 12 is dropping off a payload 20 in station a, another mobile robot 12 can be picking up a payload 20 in the same station a.

Each station comprises one or more alignment rails 16. The alignment rail 16 ensures that the mobile robot 12 enters the station at a correct angle. Given the shape of the robot described below, the alignment rail ensures that the robot will move forward through the station in the optimum position without having to perform alignment steps, which generally require the robot to slowly move back and forward. In the depicted embodiment, the clearance between the alignment rails 16 ensures that the robot can move forward through the station in only the correct physical configuration.

In one embodiment, not shown, each station includes additional mobile robot 12 alignment elements, such as painted symbols on the ground. In this embodiment, the mobile robot 12 includes a line follower sensor, such as an infrared sensor, which will detect changes in the floor pattern. In another embodiment, the rails include hooks and other electromechanical elements, such as pneumatic bumpers to force the mobile robot 12 into the correct configuration should it attempt to enter the station at an incorrect angle.

As the mobile robot 12 passes through the station, it does so in the robot movement direction 38. It first encounters the payload transfer ramp 18 which comprises two angled flanges, described below. The robot releases the payload 20 as it passes through the station, such that by the time it reaches the payload drop off area 26, the payload 20 is transferred from the mobile robot 12 to the drop-off area 26. Upon detecting the payload 20 in the drop off area 26, the station engages an arm or exchanger payload paddles 36 which move the payload 20 unto the short distance payload conveyor 30.

In one embodiment, the drop off area 26 tilts to accept an incoming or outgoing payload from a mobile robot 12.

In one embodiment, the payload conveyor 30 is a set of passive rollers, in another embodiment, the payload conveyor 30 comprises rollers rotating due to the inclusion of a motor.

The payload 20 moves on the payload conveyor 30 in the payload direction to processing 32. The payload 20 is sent to a singulator 22, which is a device which takes the payload 20 and divides it into individual components, such that the single payload can be processed as individual subparts. In turn, these payload subparts are assembled into new payloads by the collator 24 found in proximity to the singulator 22.

In one embodiment, the singulator 22 and collator 24 are implemented as pick-and-place devices that select components of payloads to either break up existing payloads (singulator 22) or to form new payloads (collator 24). In one embodiment, the singulator 22 and collator 24 use a common work area and a common short-term storage area such that the components divided out by the singulator 22 are used by the collator 24 to form new payloads 20.

One the collator 24 forms a payload 20, the payload 20 is sent in the direction of movement from processing 34. The payload 20 is sent via conveyor 30 to the payload pickup area 28. The payload 20 is picked up by a passing mobile robot 12.

As shown in FIG. 1, as the collator 24 can have a payload ready for pickup while the singulator 22 is working, the same robot moving through a station can drop off a payload 20 and pick up a new payload while passing through the station. Mobile robot 12 interactions with the pickup area 28 and the drop off area 26 occur without the robot having to completely stop, as will be described fully below.

As shown in FIG. 1, the mobile robots 12 are designed to take the place of fixed conveyors systems, as would be required in prior art approaches. Each mobile robot can move a payload 20 over the same distance as a traditional conveyor system would take. As part of the system 10, devices such as pick and place machines would provide the initial payloads to the singulator 22 and collator 24 devices. After the initial loading, the mobile robots 12 in conjunction with the stack exchanger 14 arrays can move all the inventory around the workspace. Retrieval to and from warehouse shelves is handled by another system, such as fixed arms or as described in applicant's own U.S. Patent Application 62/302,070, incorporated herein by reference. In one embodiment, the system includes shufflers and stackers that arrange and stack trays/totes before sending them to the stack exchanger 14. As a stack is received, each is rearranged by singulator into trays/totes. The RoboFrame described in the above-listed application presents one embodiment of a mechanism to construct and deconstruct stacks.

Mobile Robot Details

Figure 2A:
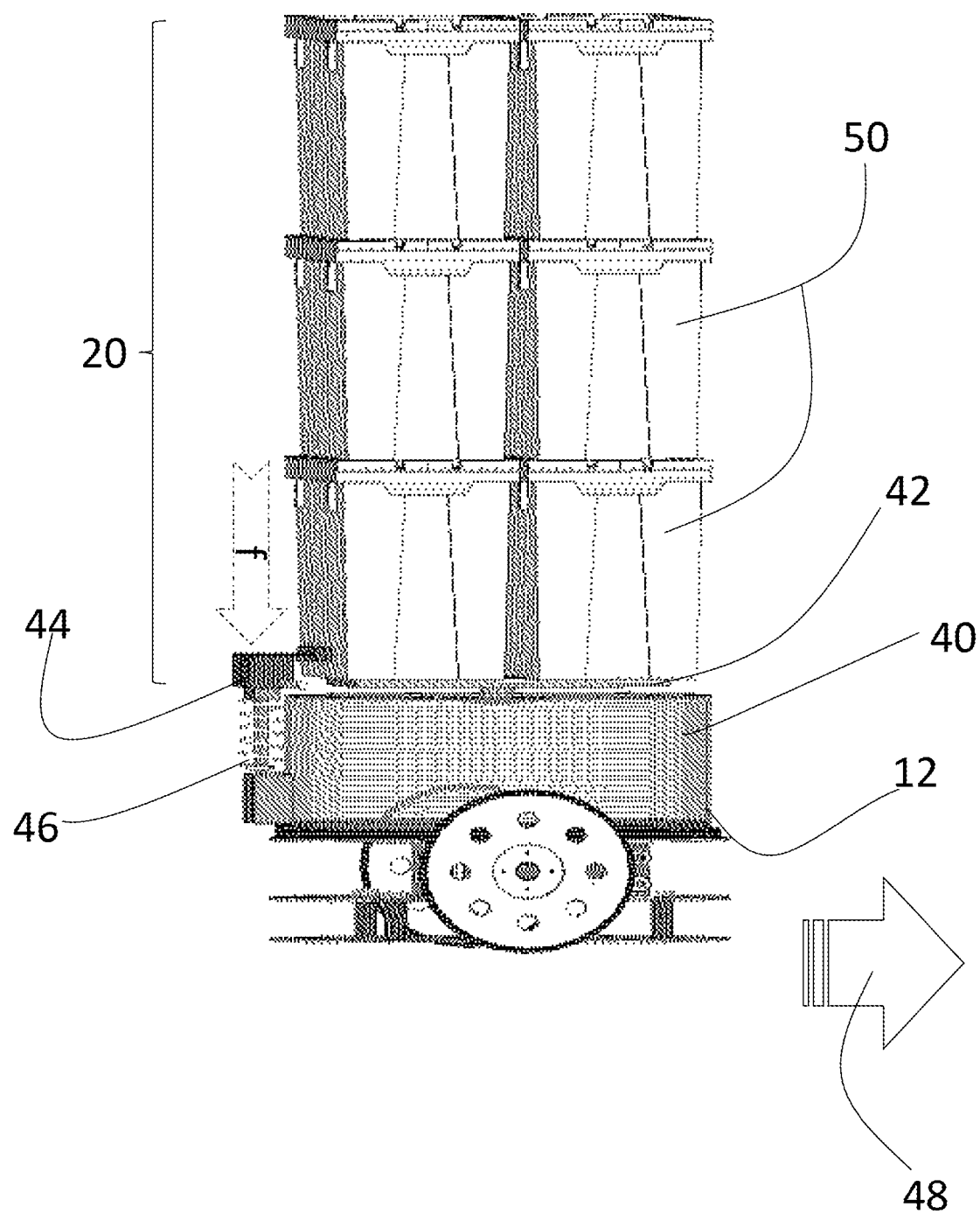
FIG. 2A depicts a detailed side view of a component of the invention.

Turning to FIG. 2A, depicted therein is a side view of a mobile robot 12. The mobile robot 12 comprises a robot main body 40 and a movement mechanism such as the wheels shown in FIG. 2A. The robot main body 40 comprises a housing for the robot motors, encoders, sensors, and logic controller.

A load bearing platform 42 is supported by the robot main body 40. In one embodiment, the platform 42 is tilt-able, in another embodiment, the platform 42 is maintained at a constant level. The payload 20 rests on the platform 42.

As shown in FIG. 2A, the payload 20 consists of a number of individual totes 50 or trays (not shown) or combinations thereof as provided by the collator depicted in FIG. 1.

The mobile robot 12 moves in the forward direction of movement 48. The payload 20 exerts a force against the moveable latch 44. The latch 44 maintains the payload 20 on the platform 42 by preventing the payload 20 from sliding off the platform 48 as the robot moves in the forward direction 48. The latch 44 is supported by a spring loaded mechanism 46. A downward force f on the latch 44 will move the latch 44 in the direction of the force f, but once the force f is removed, the latch spring mechanism 46 will cause the latch to revert to an upward position.

As will be described in detail below, the payload 20 will slide off the bearing platform 42 if the latch 44 is disengaged. The bearing platform 42 is therefore comprised of a low friction material, such as ultra-high molecular weight plastic.

Figure 2B:
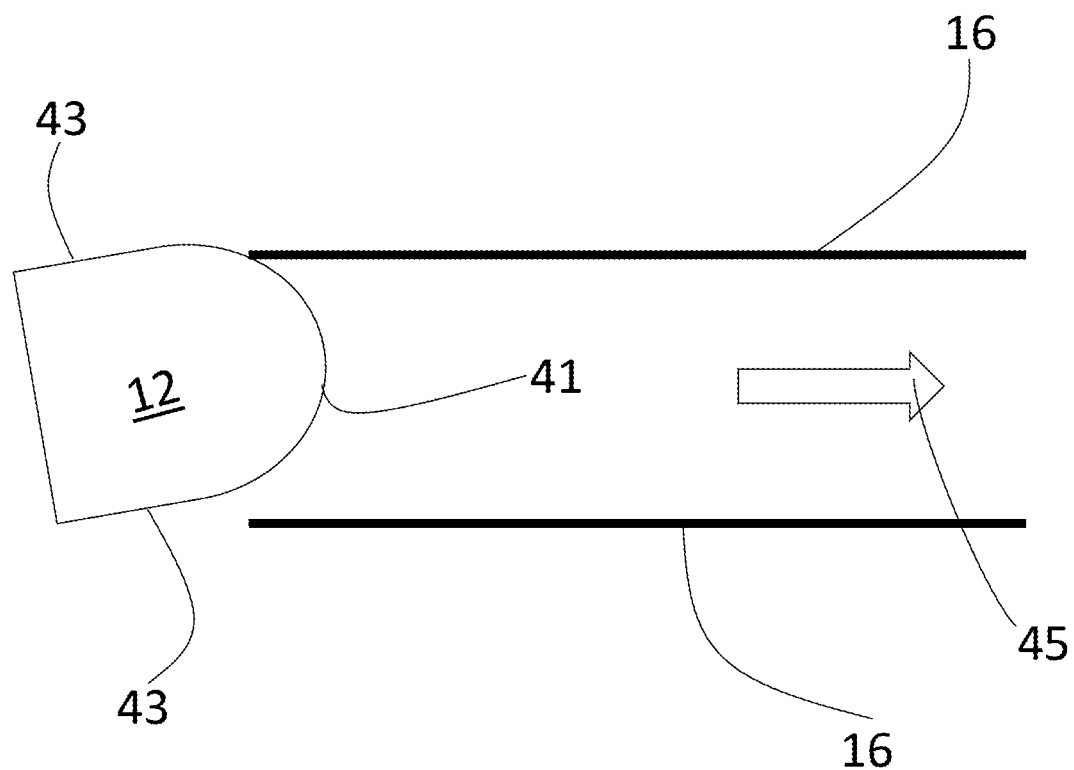
FIG. 2B depicts a schematic top view of a component of the invention.

A top view of the mobile robot 12 is shown in FIG. 2B. The mobile robot 12 consists of a main body curved portion 41 and main body straight portions 43 on opposing sides of the mobile robot 12. As shown in FIG. 2B, the mobile robot 12 is moving in the forward direction 45.

As the mobile robot 12 encounters a station, one or more of its portions 41, 43, will encounter a surface of the alignment rail 16. The mobile robot 12 will continue to rotate while moving forward so long as the rails 16 are contacting a surface other than the opposing straight portions 43. When both straight portions 43 are engaged with opposing alignment rails 16 then the robot can cease rotating.

In one embodiment, each mobile robot 12 includes a system for tracking of its present location as well as a path back to a designated temporary storage or maintenance location. In one embodiment, this maintenance location is also a place to charge each mobile robot, by providing electrical contacts embedded in a surface for corresponding electrical contacts on the robot to recharge the robot. In an alternative embodiment, the maintenance area includes a wireless charging substrate and each mobile robot includes a wireless charging receiver, such as an induction receiver.

In one embodiment, as each mobile robot 12 passes through the components of the system, such as the exchangers 14, each mobile robot 12 is charged as it passes over induction wireless charging elements embedded in the stations comprising the exchangers 14.

In one embodiment, the mobile robot 12 is designed for primary movement in only one direction and its sensors and logic are optimized for movement in the one forward direction. In this way, the costs associated with the mobile robot 12 are minimized. Nonetheless, the mobile robot 12 is capable of turning on its axis by spinning its wheels and can travel backward, but without direct sensor input.

Container Details

Figure 2C:
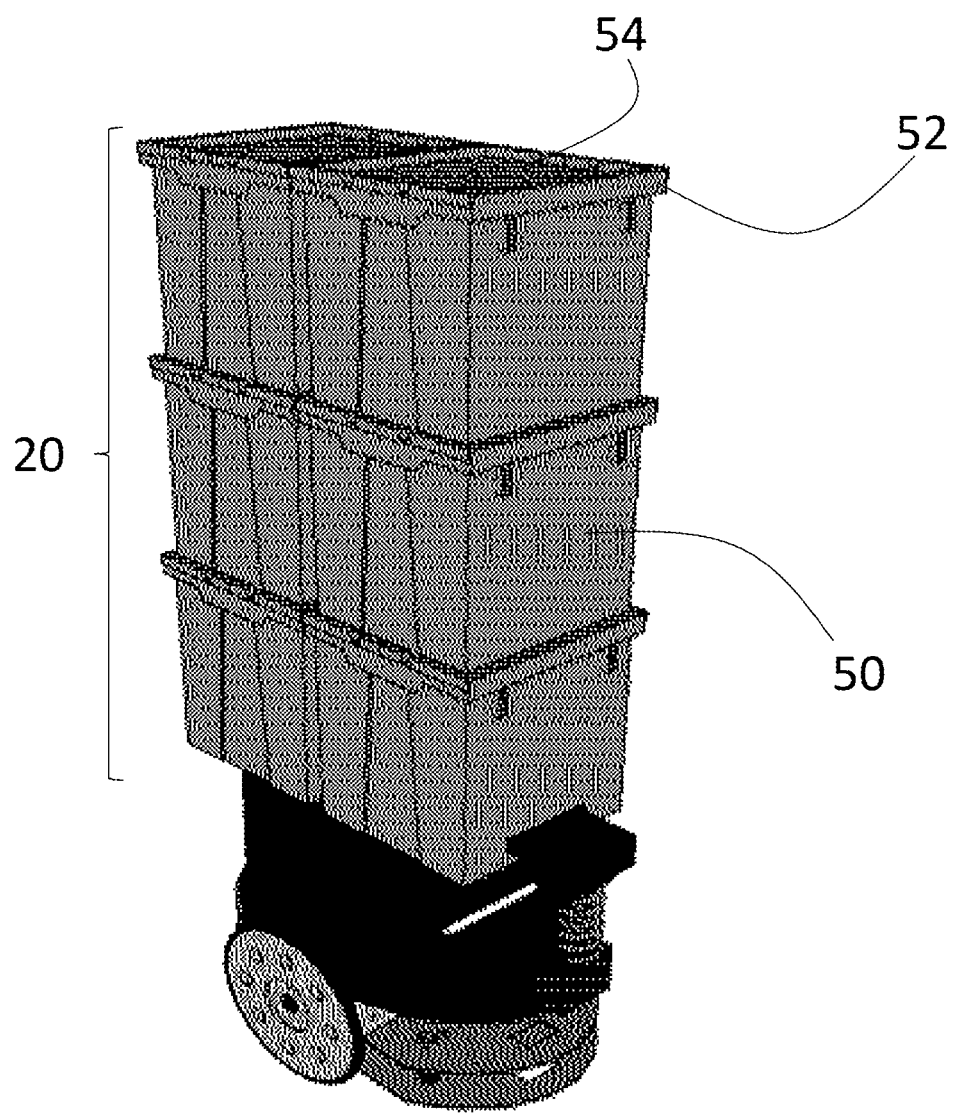
FIGS. 2C, 2D, and 2E depict an overview of storage containers used in conjunction with the invention.

FIG. 2C show details of a tote container stack which would comprise a payload 20. Each tote 50 includes a cover 54 and a tote lip 52. The tote lip 52 engages a bottom surface of each tote such that a stack of the totes comprising a payload 20 remains engaged with one another. In some embodiments, exterior side surfaces include computer-readable insignia, such as bar codes, or QR codes such that the system can track individual totes.

In one embodiment, the tote top surface 54 is of sufficient strength to support two additional totes stacked on top of the top surface 54. In this embodiment, the totes 50 comprise a resilient plastic, capable of carrying heavy loads without sudden failure. In one embodiment, the plastic containers top and bottom somewhat deform and change color in the event they are overloaded. In this way, using automated visual inspections of the totes 50, the system can determine which totes 50 should be removed out of the use cycle.

Figure 2D:
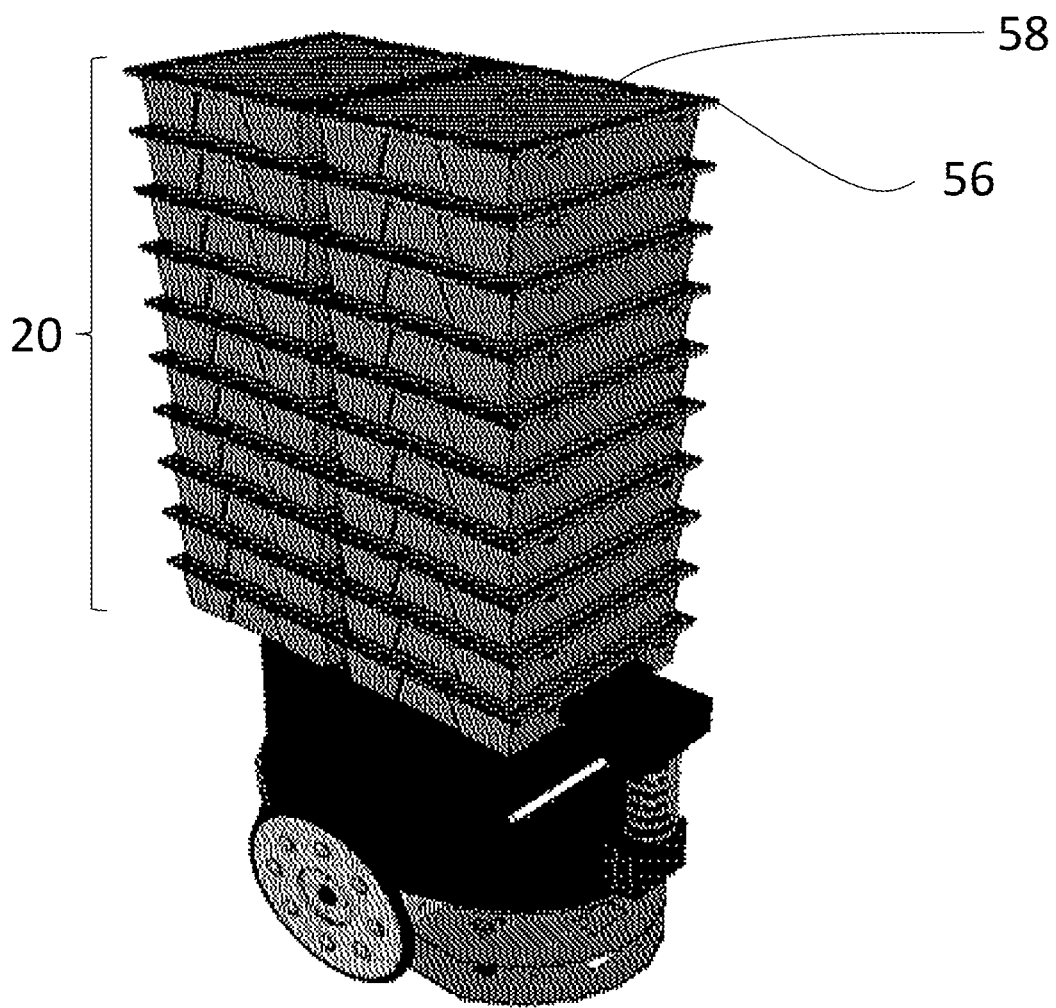

FIG. 2D depicts additional product containers, using smaller trays 56 instead of the totes 50 of FIG. 2C. The trays 56 include tray covers 58 to lock multiple trays into one another. The trays 56 also form payloads.

Figure 2E:
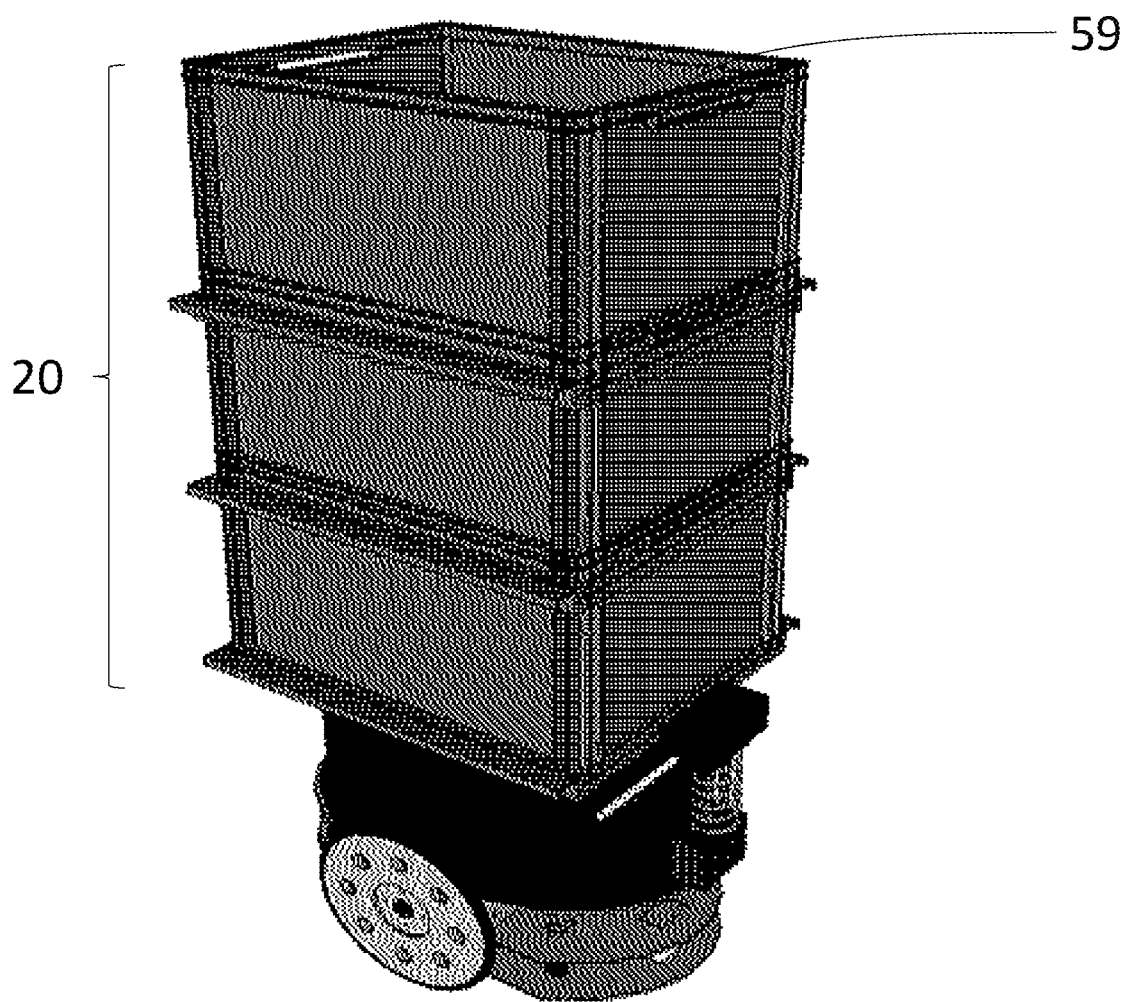

FIG. 2E depicts an additional form of product containers, open top crates 59, having a lip in the open end wherein the flat bottom of a crate rests against the lip of the open end of a preceding crate.

In one embodiment, the payload 20 comprises a mix of trays 56 and totes 50. As was discussed above, the singulator 22 and collator 24 shown in FIG. 1, are responsible for dividing out and assembling of the trays and totes into payloads 20.

Interaction of Mobile Robot with Stack Exchanger

Figure 3A:
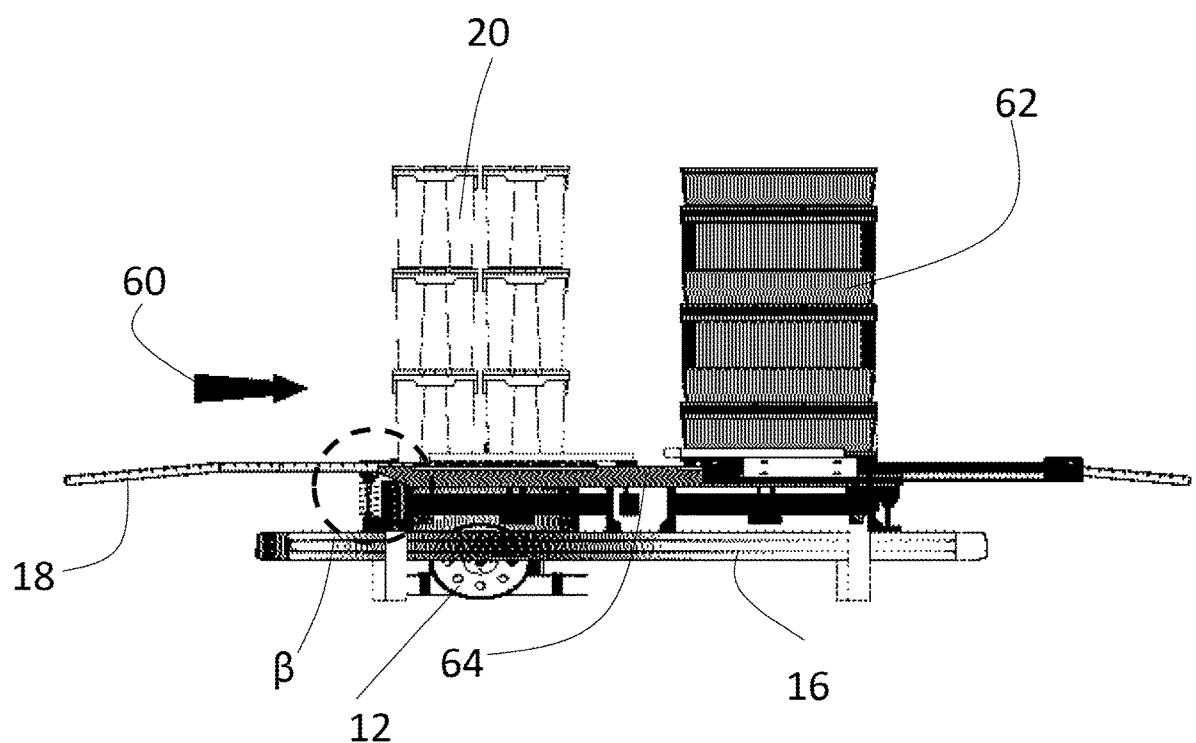
FIGS. 3A and 3B depict an overview of operation of the invention.

FIG. 3A depicts a side view of a mobile robot 12 as it passes through the stack exchanger 14.

Figure 3B:
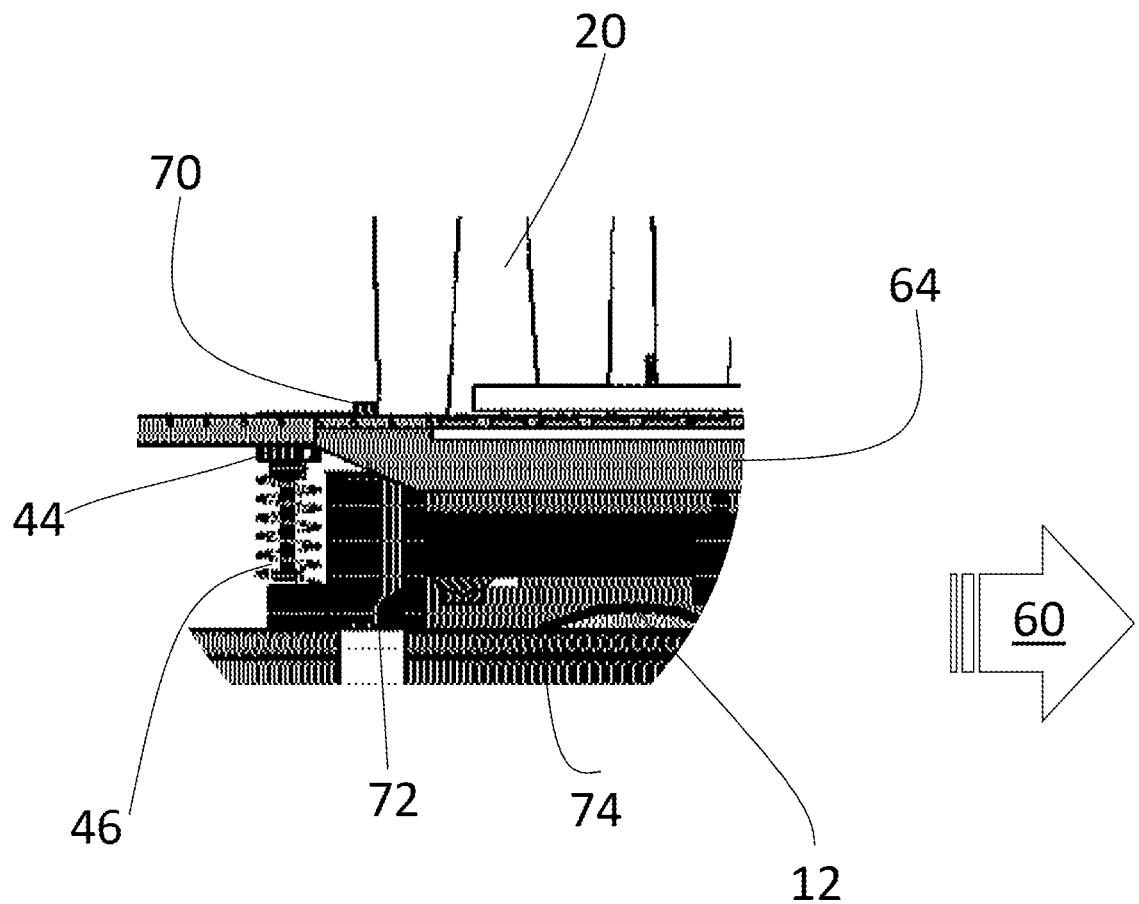

The mobile robot is moving in the direction 60. At the time shown in FIG. 3A, the mobile robot 12 has passed the beginning of the payload transfer ramp 18, but the payload 12 remains on the mobile robot 12. Until the exchanger latch engagement bar 64 causes the mobile robot latch 44 to be lowered, the payload 20 remains on the robot 12. The action of the engagement bar 64 on the latch 44 is shown in FIG. 3B, which shows a detailed view of the area designated by 13 in FIG. 3A.

Once the mobile robot 12 moves through the exchanger 14, it will drop off the load 20 and pick up the pickup payload 62 readied for the mobile robot 12 by the collator shown in FIG. 1.

In one embodiment, the mobile robot 12 passes through the exchanger dropping off one payload 20 and picking up another payload 62 without stopping, and also without having to move backward and forward for the mobile robot 12 to align itself. The entire process occurs within a period of time less than two seconds, in one embodiment. While in most embodiments, the mobile robot 12 can exchange payloads without stopping, in other embodiments, the mobile robot 12 does stop during the payload exchange process. In this embodiment, the stop is an opportunity to ensure that the payload has been received by robot correctly, such as through automated visual inspection. In another embodiment, the weight of the robot and payload is measured to ensure that the expected payload has been provided to the mobile robot 12 and to ensure that during loading the payload did not shift. In this embodiment, two different scales are used on each wheel to confirm proper distribution of the weight.

In the embodiments where the mobile robot 12 comes to a stop during the loading and unloading process, the mobile robot 12 nonetheless does not require programming and execution of highly precise and complicated docking maneuvers. Any stop of motion will not greatly delay the mobile robot 12 and does not result in congestion of other robots seeking to either load or unload payloads.

As shown in FIG. 3A, the payload transfer ramp 18 has a downwardly sloping section to help in guiding the robot payload 20 and to engage the bottom surface of the payload 20 as it is being transferred to the payload bearing platform 42.

The details of the interaction between the mobile robot 12 latch 44 and the exchanger latch engagement bar 64 are shown in FIG. 3B. The mobile robot 12, is moving in the designated direction 60 and is carrying the payload 20. The payload 20 rests against the latch 44 payload bearing surface 70 which holds the payload 20 in place.

As the mobile robot 12 moves in the direction 60, the latch 44 engages the first angled portion 72 of the latch engagement bar 64. This causes the latch 44 to lower, in turn lowering the bearing surface 70. Eventually, the latch 44 encounters a sufficient quantity of the angled portion 72 such that it lowers the bearing surface 70 so that the payload 20 is no longer held in place on the robot 12.

At that point, the payload 20 slides off the robot and is left on the payload drop off area 26.

As the mobile robot 20 continues to move in the direction 60, the latch 44 engages with the substantially straight portion 74 of the engagement bar 64. This straight portion 74 results in the latch 44 being lowered fully. However, once the bar 64 ends, the latch 44 returns to its original configuration due to the presence of the deformable spring 46, which will cause the payload bearing surface 70 to pop back up once the engagement bar 64 ends. In this way, as the mobile robot 12 traverses the exchanger 14, it can drop off one load while picking up a second load all while continuing to move forward.

Exchanger Details

Figure 4:
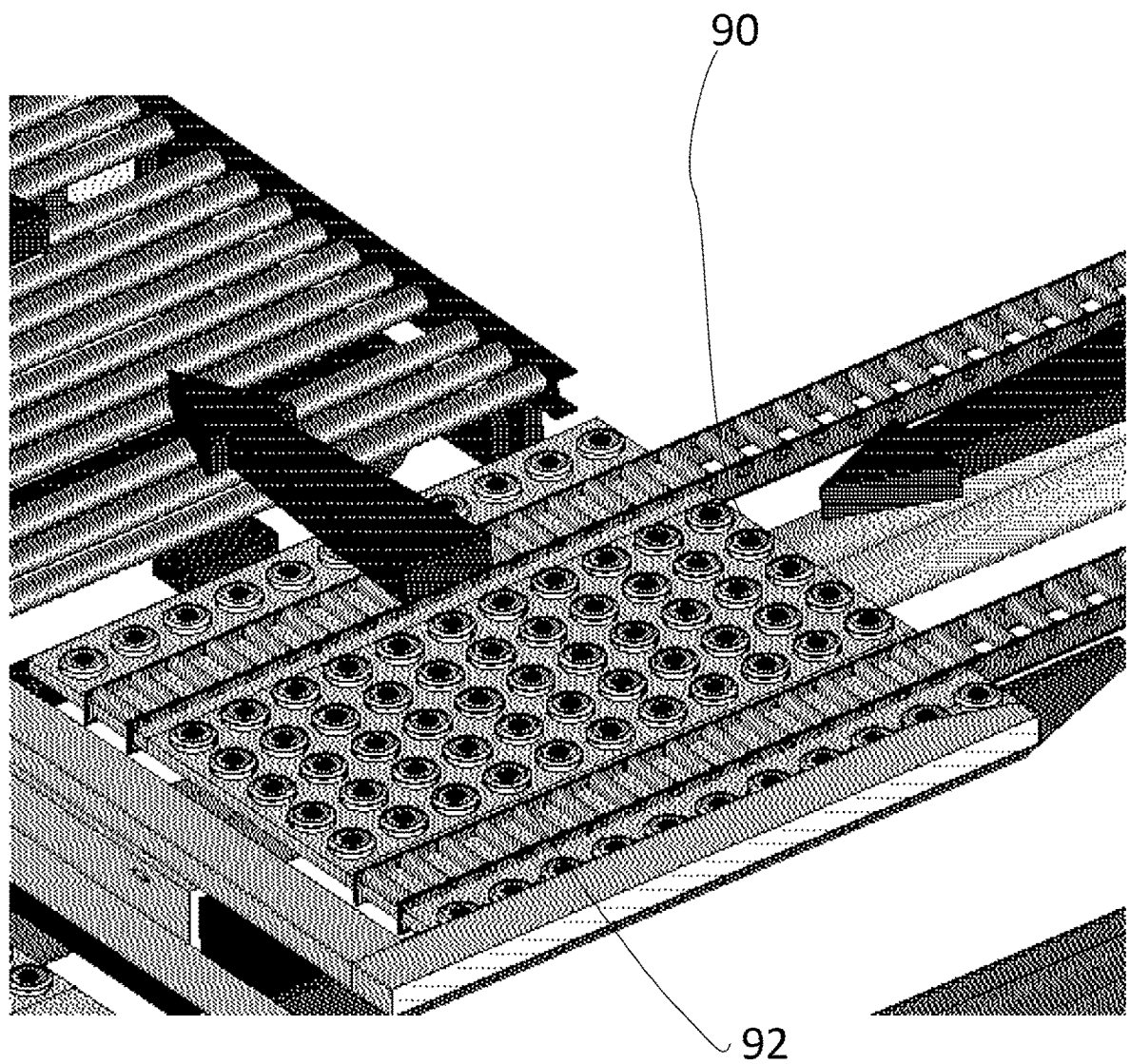
FIG. 4 depicts another view of an embodiment of a component of the invention.

Turning to FIG. 4, depicted therein is a depiction of the payload transfer area 90, either the pickup area 28 or the drop off area 28 shown in FIG. 1. The payload transfer area 90 comprises an array of ball bearings or balls 92 which allow the payload to move in any direction. In the depicted embodiment, the ball bearings 92 are installed with a density of 36 per square foot of the transfer area 90, in one embodiment. However, other suitable densities are used as well.

A benefit of the system is that the same transfer area 90 can be used for both pickup and drop off and does not require powered components, such as motorized conveyors.

Figure 5:
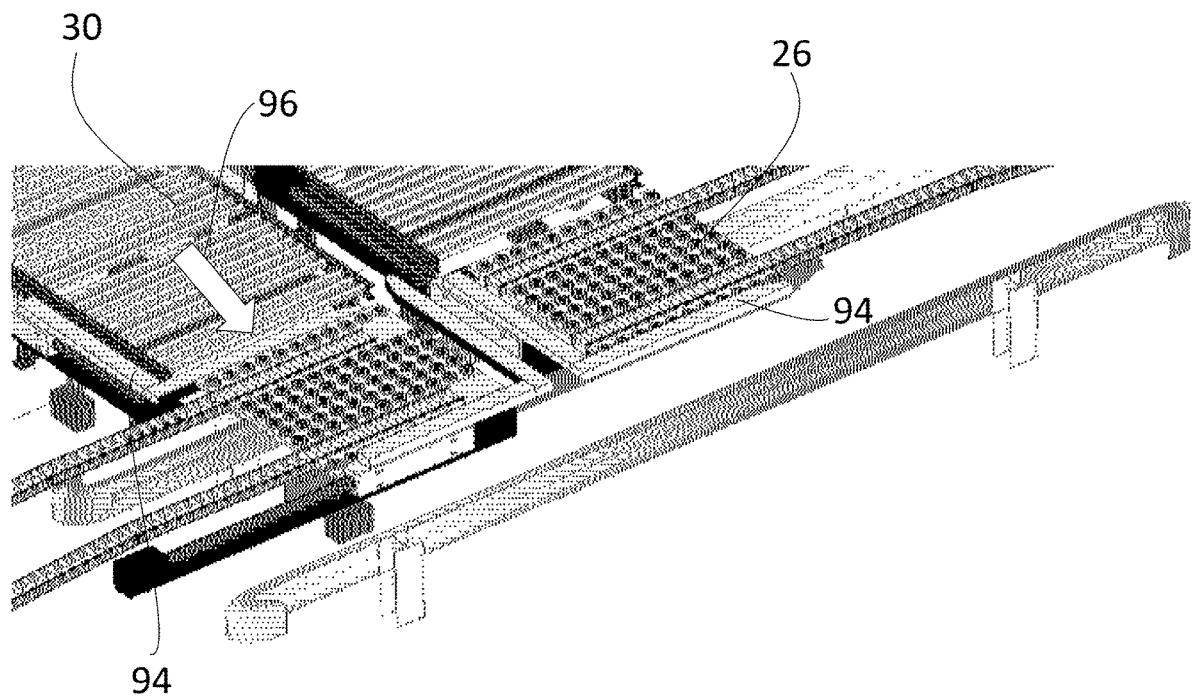
FIG. 5 depicts another view of an embodiment of a component of the invention.

As shown in FIG. 5, the exchanger also uses a number of simple pusher arms 94. The pusher arms 94 move payload stacks from the short conveyors 30, in one embodiment. The pusher arms 94 also move payloads to the transfer area, such as the drop off area 26 shown in FIG. 5. The pusher arms 94 are simple devices which simply pop up above the surface of either conveyor 30 or transfer area and push the bottom of the payload stack in the direction 96. The pusher arms 94 require only limited a range of motion and limited freedom of motion. In one embodiment, the pusher arms 94 are implemented as simple L-shaped arms where the payload engagement portion of the L-shape can be moved up and down using a screw mechanism. In another embodiment, the payload engagement portion of the arms 94 moves up and down using a pneumatic mechanism.

Method of Use

Figure 6:
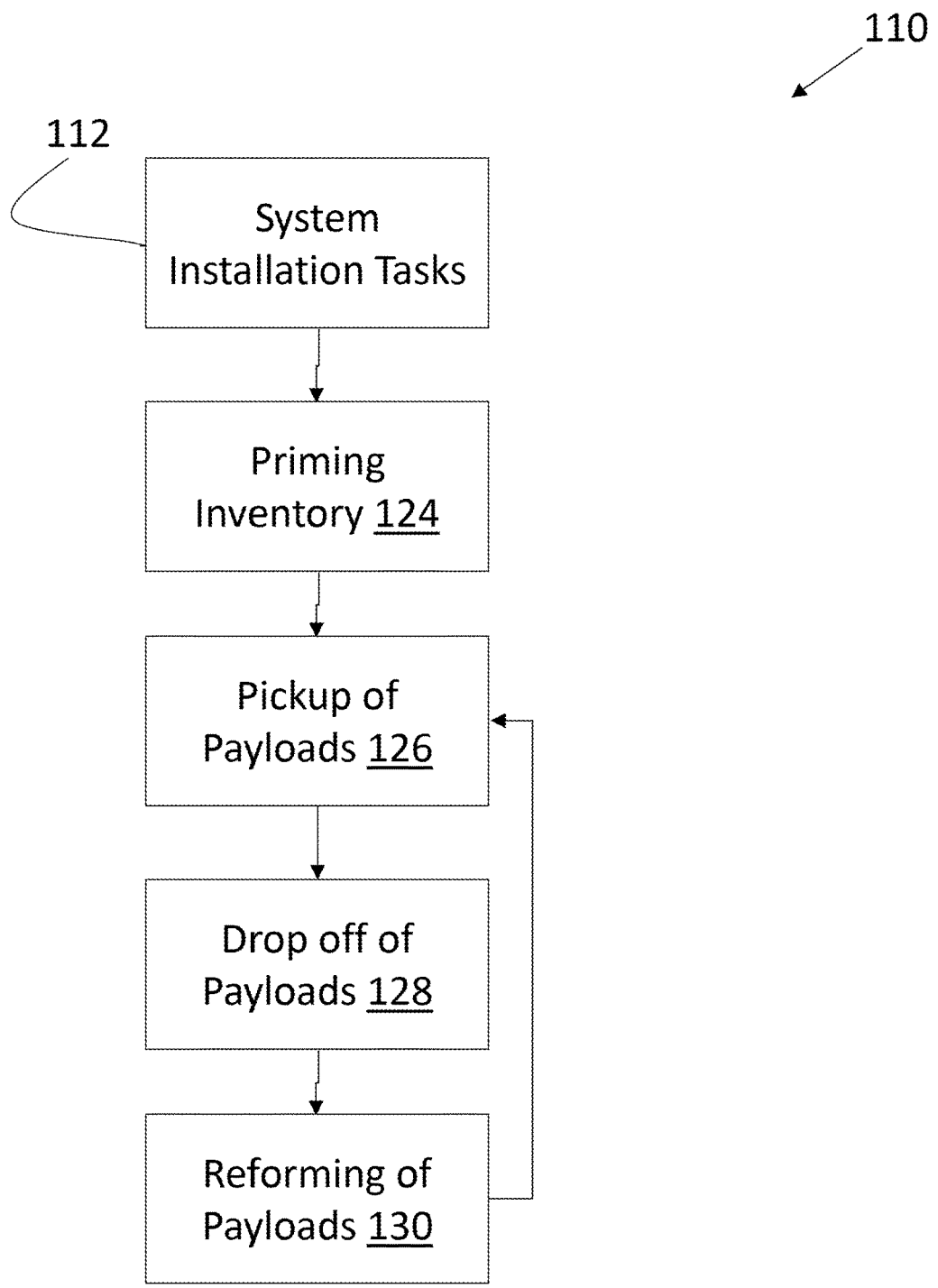
FIG. 6 depicts an overview of the method of use of the invention.

Discussed in FIG. 6, the system comprises a method 110 of moving inventory around a warehouse or other facility without using long distance conveyors.

The method begins with system installation tasks, which include deploying the stack exchangers and adding the latches to a fleet of mobile robots. In one embodiment, the number of stack exchangers at each location is two, so as to allow at least one drop off and one pick up task to occur at a time. In other embodiments, arrays of many stack exchangers are installed at multiple locations. The maximum number of stack exchangers stations at a single location is determined by the amount of floor space available and the distances to be covered by the mobile robots. Each station has an associated collator or singulator, in one embodiment. In another embodiment, a single collator and a single singulator are assigned to each array of stations forming stack exchangers.

The method proceeds to prime the inventory 124 of the collators. This allows each collator to design initial payloads for mobile robot pickup.

Once a payload is ready, a mobile robot picks up same 126. The stack exchanger collator will continue to combine available inventory for additional payload pickups while waiting for a mobile robot to pick up the payload.

Concurrently with the pickup, in some embodiments, and at times after the initial pickup, another payload is dropped off 128 at an active stack exchanger. The stack exchanger singulator breaks down the dropped off payload to make the inventory available to the collator. The collator reforms a new payload 130 to be picked up by a mobile robot. The system continues to operate so long as inventory remains to be reformed into new payloads, or so long as inventory exists that requires movement from one location to another.

The system can enter into a power saving mode when no task is required of it or when no further inventory is either inbound to an exchanger or no payloads can be formed with the inventory available to the collator.

Alternative Embodiment

Figure 7:
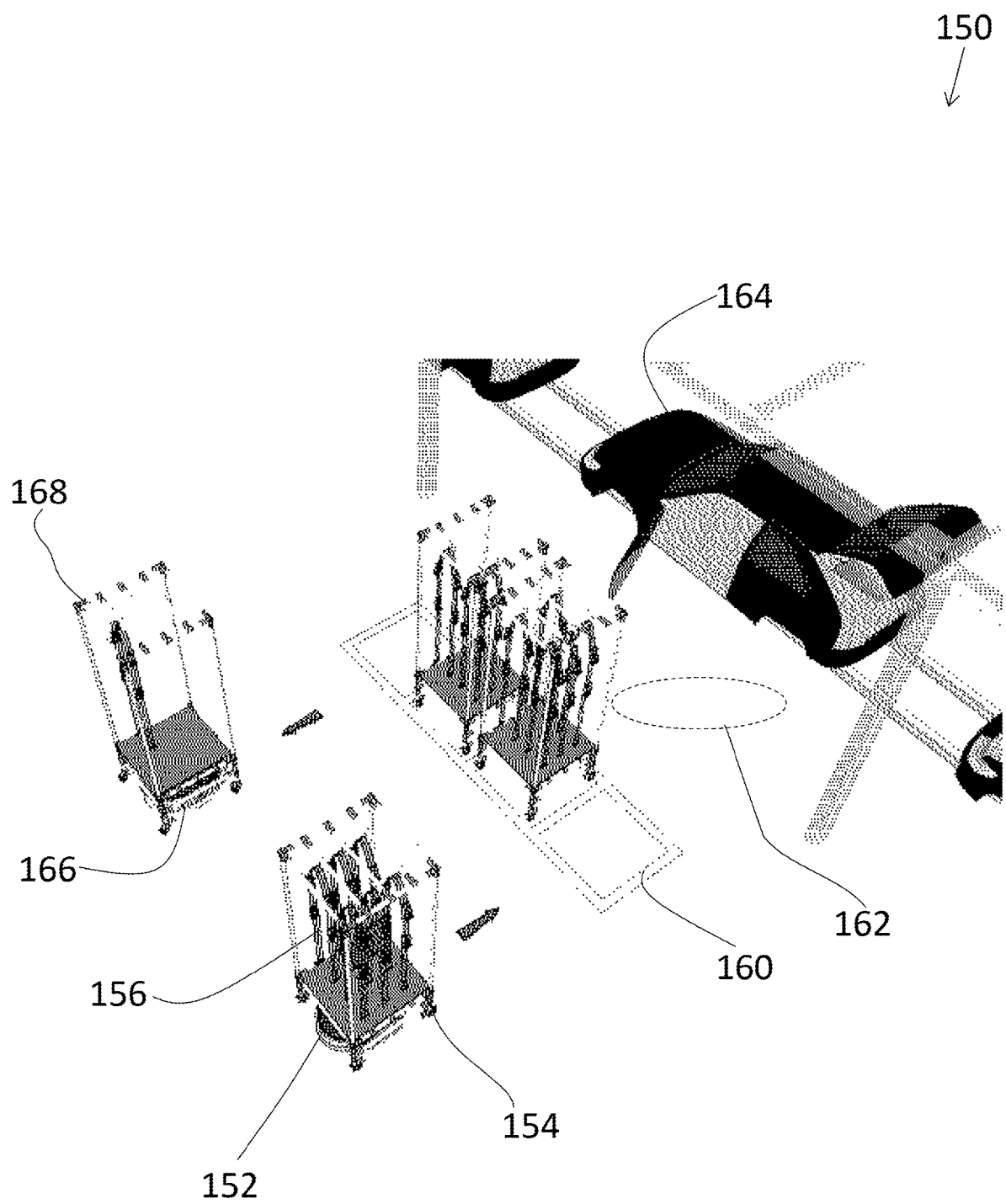
FIG. 7 depicts an alternative embodiment of the invention.

As shown in FIG. 7 and onwards, some inventory that requires movement around a worksite is not suitable for movement using totes and trays.

Briefly, in prior art approaches, all the components for a particular task are provided to a location as a single kit to be assembled. The problem with this approach is that it requires production of kits from warehouse inventory. Broken parts or missing parts in a kit will stop assembly, but may not be discovered until the assembly tasks are begun. Further, it is time-consuming to collect all the components and prepare the kits. As such, the proposed alternative embodiment allows for movement of many copies of items needed for an assembly job, without forming individual kits.

In place of preparing and delivering individual kits to a worker, in the system 150 shown in FIG. 7, a mobile robot 152, engages with a frame 154. In one embodiment, the frame 154 is optimized for moving large items. The frame 154 includes hooks or other attachment means for holding bulky objects needed for the assembly task. The frame 154 contains more than a single piece needed in the work area 162 or job location, where assembly project 164 is being completed.

Instead, the frame 154 containing many suitable objects 156 for the job is brought to the work area 160. The worker may select one object 156 or as many as are needed for the task. A second mobile robot 166 is used to remove a second frame 168 from the work area 160 to a storage location. In one embodiment, a high frequency temporary storage location is defined as separate from a long term storage or inventory storage location.

Each frame is made from light-weight yet durable material such as aluminum rods, PVC piping, or other rigid, yet lightweight material. The bottom of the frame 154, 168 surface engages the top surface of the corresponding mobile robot 152, 166.

Figure 8:
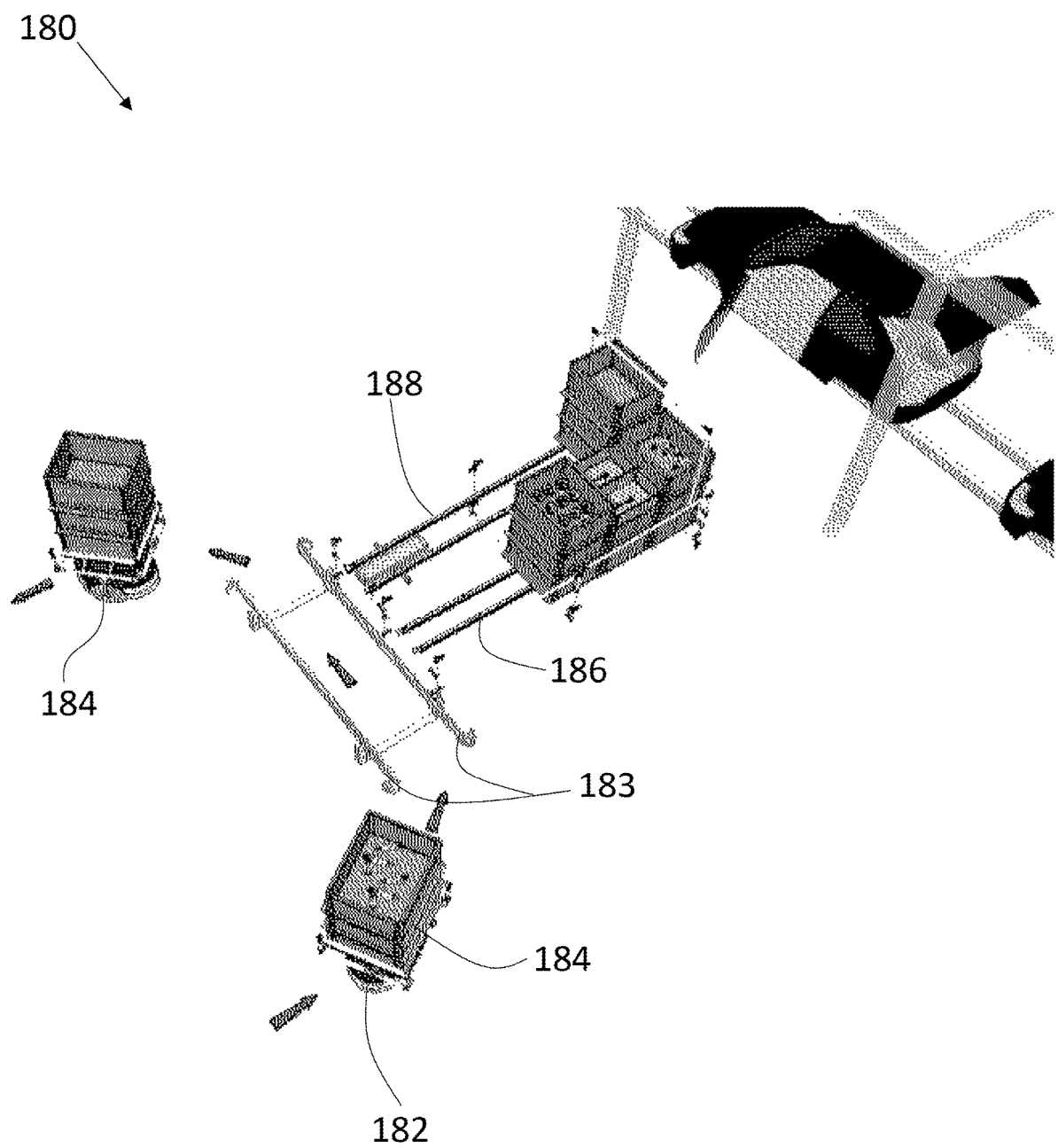
FIG. 8 depicts another alternative embodiment.

As shown in FIG. 8, in another embodiment 180, the mobile robot 182 moves a frame containing trays 184 of components. In one embodiment, each tray contains a set of components. The mobile robot 182 brings a frame 184 to a pair of alignment rails 183 where one or more trays 184 is moved to the job conveyor 186. The robot may also receive one or more trays 184 at a second sending conveyor 188. This automotive kit can transport open pallets of goods or a bin of raw material, or even finished goods to another station.

As shown in FIG. 8, the transfer of the payload occurs when the mobile robot drives in-between the shown guides. The mobile robot and its platform are aligned with the inbound flow rack the platform tilts so that the mobile robot payload is deposited into the flow rack. When the mobile robot is aligned with the outbound flow rack, the mobile robot platform tilts in the opposite side to actuate the singulation device to release the stack onto the platform.

Figure 9A:
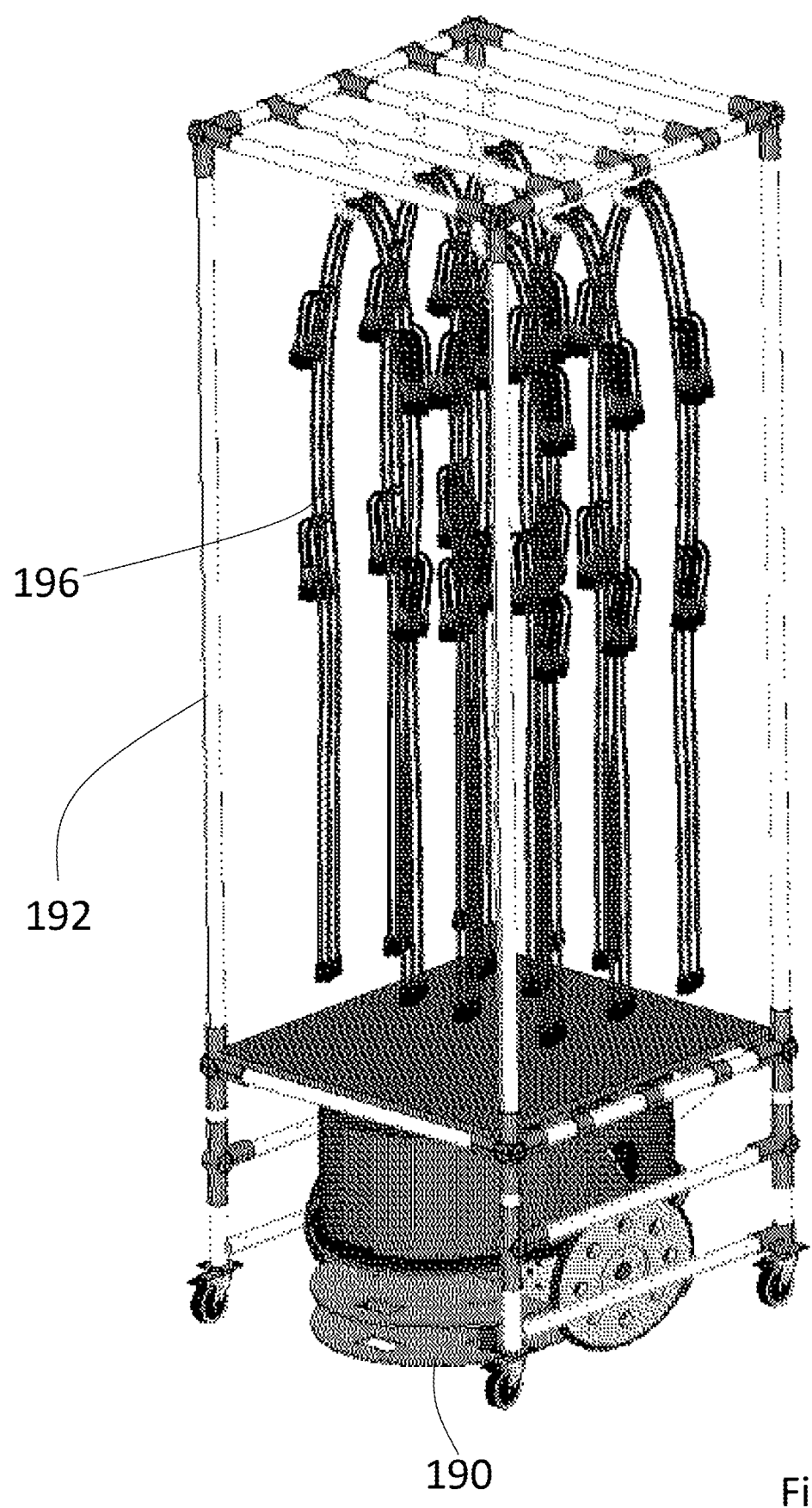
FIGS. 9A and 9B depict a view of further embodiments of the invention.
Figure 9B:
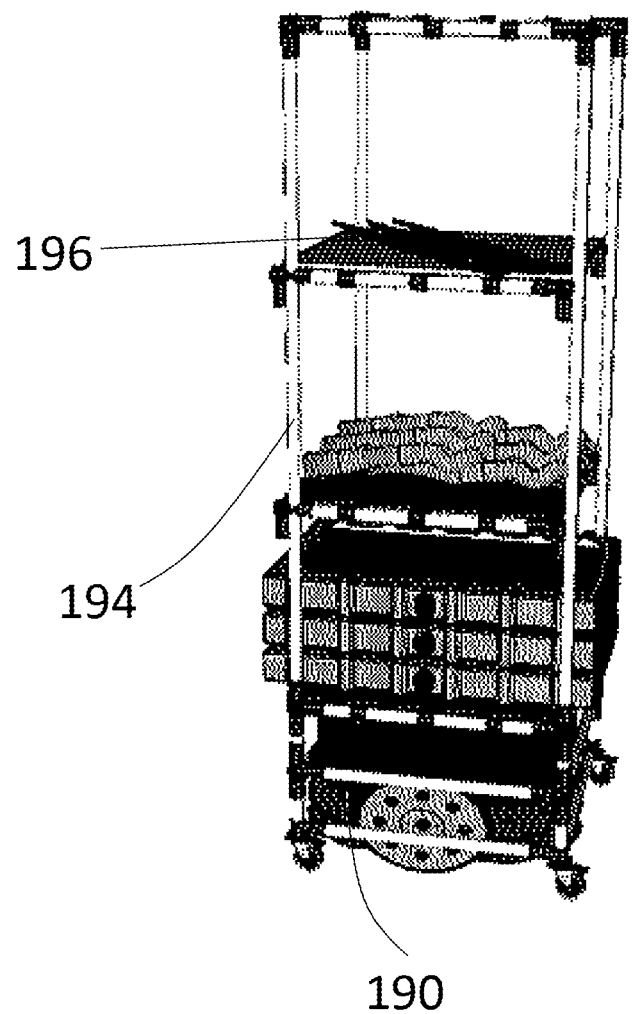

Several exemplary combinations of a mobile robot 190 with frames 192, 194, configured to convey different types of products 196, are shown in FIGS. 9A and 9B. Each is optimized to convey a specific type of bulky product. As shown in FIGS. 9A and 9B, the depicted frames 192, 194 are low-cost carts made up of a frame. Each cart is customized to carry large items without damage and present them to the operator in an ergonomic way. In one embodiment, the frames 192, 194 include RFID identifiers and the system uses the RFID identifiers to identify the cart, the cart type, content, and location.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The embodiment of the invention in which an exclusive property or privilege is claimed is defined as follows:

1. A system for moving payloads comprising:
    at least one mobile robot; wherein each mobile robot comprises a payload bearing platform, and a payload release latch; and
    at least one stack exchanger having a set of alignment elements, a payload transfer ramp, and a latch engagement bar;
    wherein each said mobile robot passes through the stack exchanger and picks up a payload or drops off a payload;
    wherein said stack exchanger alignment elements direct each mobile robot payload bearing platform to reversibly engage the payload transfer ramp, and the stack exchanger latch engagement bar releases each mobile robot's payload release latch during mobile robot traversal of said stack exchanger;
    wherein each stack exchanger further comprises a payload exchange area comprising rolling elements wherein the latch engagement bar releases the mobile robot release latch so that the passing mobile robot payload is released in the payload exchange area.

2. The system of claim 1 wherein said mobile robot payload release latch comprises a spring-loaded member.

3. The system of claim 1 further comprising an array of stack exchangers arranged in close proximity wherein each stack exchanger is designated either to pick-up or drop-off of payloads.

4. The system of claim 3 wherein each array of stack exchangers further includes a collator to combine dropped off payloads for pickup by a mobile robot.

5. The system of claim 3 wherein each array of stack exchangers further includes a singulator to split up dropped off payloads for pickup by a mobile robot.

6. The system of claim 3 wherein each stack exchanger within the array further comprises a payload exchange area comprising rolling elements wherein the latch engagement bar releases the mobile robot release latch so that the passing mobile robot payload is released in the payload exchange area.

7. The system of claim 6 wherein each stack exchanger further comprises payload conveyer and adjustable arms wherein said stack exchanger adjustable arms move payloads between the payload exchange area and the payload conveyer.

8. The system of claim 7 wherein said payload conveyer connects different stack exchangers comprising the array of stack exchangers.

9. The system of claim 1 wherein each stack exchanger further comprises payload conveyer and adjustable arms wherein said stack exchanger adjustable arms move payloads between the payload exchange area and the payload conveyer.

10. The system of claim 1 wherein each said mobile robot passes through the stack exchanger and picks up the payload or drops off the payload without fully stopping motion.

11. The system of claim 1 wherein each said mobile robot makes at least one stop as it passes through the stack exchanger and picks up the payload or drops off the payload.

12. The system of claim 1 wherein each said mobile robot passes through the stack exchanger and picks up the payload or drops off the payload without moving backward to perform alignment procedures.

13. The system of claim 1 wherein said alignment elements comprise rails.

14. The system of claim 1 wherein said alignment elements comprise location symbols.

15. A method of moving payloads comprising:
providing at least one mobile robot; wherein each mobile robot comprises a payload bearing platform, and a payload release latch; and
providing at least one stack exchanger having a set of alignment elements, a payload transfer ramp, and a latch engagement bar;
wherein each said mobile robot passes through the stack exchanger and picks up a payload or drops off a payload;
wherein said stack exchanger alignment elements direct each mobile robot payload bearing platform to reversibly engage the payload transfer ramp and the stack exchanger latch engagement bar releases each mobile robot's payload release latch during mobile robot traversal of said stack exchanger;
wherein each said mobile robot passes through the stack exchanger and picks up the payload or drops off the payload without fully stopping motion.

16. The method of claim 15 wherein each said mobile robot passes through the stack exchanger and picks up the payload or drops off the payload stopping motion.

17. The method of claim 15 wherein each said mobile robot passes through the stack exchanger and picks up the payload or drops off the payload without moving backward to perform alignment procedures.

18. The method of claim 15 wherein said alignment elements comprise rails.

19. A method of moving payloads comprising:
providing at least one mobile robot; wherein each mobile robot comprises a payload bearing platform, and a payload release latch; and
providing at least one stack exchanger having a set of alignment elements, a payload transfer ramp, and a latch engagement bar;
wherein each said mobile robot passes through the stack exchanger and picks up a payload or drops off a payload;
wherein said stack exchanger alignment elements direct each mobile robot payload bearing platform to reversibly engage the payload transfer ramp and the stack exchanger latch engagement bar releases each mobile robot's payload release latch during mobile robot traversal of said stack exchanger;
wherein each stack exchanger further charges each mobile robot while each mobile robot interacts with the stack exchanger.

20. The method of claim 19 wherein said alignment elements comprise rails.

* * * * *